United States Patent [19]

Kotani

[11] Patent Number: 5,279,881
[45] Date of Patent: Jan. 18, 1994

[54] LAMINATED POLYESTER FILM FOR MAGNETIC RECORDING MEDIUM COMPRISING SPECIFIC PARTICLES

[75] Inventor: Tomoyuki Kotani, Machida, Japan

[73] Assignee: Daifoil Hoechst Company Limited, Tokyo, Japan

[21] Appl. No.: 940,317

[22] Filed: Sep. 3, 1992

[30] Foreign Application Priority Data

Sep. 3, 1991 [JP] Japan .................. 3-253103

[51] Int. Cl.$^5$ .................................................. B32B 3/00
[52] U.S. Cl. .................................. 428/141; 428/217; 428/323; 428/480; 428/694 ST; 428/694 SL; 428/694 SG; 428/910
[58] Field of Search ................... 428/480, 217, 694

[56] References Cited

U.S. PATENT DOCUMENTS

| | | | |
|---|---|---|---|
| 4,568,599 | 2/1986 | Ono et al. | 428/141 |
| 4,798,759 | 1/1989 | Dallman et al. | 428/220 |
| 4,922,675 | 5/1990 | Sato et al. | 51/394 |
| 4,990,400 | 2/1991 | Endo et al. | 428/331 |
| 5,069,962 | 12/1991 | Okazaki | 428/323 |
| 5,085,915 | 2/1992 | Taga et al. | 428/141 |
| 5,089,331 | 2/1992 | Ryoke et al. | 428/323 |
| 5,096,773 | 5/1992 | Sakamoto | 428/323 |

FOREIGN PATENT DOCUMENTS 0345644 12/1989 European Pat. Off. .

Primary Examiner—Paul J. Thibodeau
Assistant Examiner—H. Thi Lé
Attorney, Agent, or Firm—Foley & Lardner

[57] ABSTRACT

A laminated polyester film for a magnetic recording medium which has a first polyester layer (A) containing inorganic particles (a) having a Moh's hardness of at least 8 and a specific average particle size and inactive particles (b) having a Moh's hardness of less than 8 and a specific average particle size larger than that of the particle (a) and a second polyester layer (B) containing inactive particles (c) having a Moh's hardness of less than 8 and a specific average particle size, wherein a content of the particles (a) is from 0.25 to 5% by weight based on the weight of the polyester in the layer (A) and less than 0.15% by weight of the whole weight of the polyester in the layers (A) and (B), the contents of the particles (b) and (c) are each 0.05 to 2.0% by weight of the polyester in the layers (A) and (B), respectively, and exposed surfaces of the layers (A) and (B) have coefficients of friction and surface roughness (Ra) which satisfy the specific conditions.

14 Claims, 1 Drawing Sheet

LAMINATED POLYESTER FILM FOR MAGNETIC RECORDING MEDIUM COMPRISING SPECIFIC PARTICLES

BACKGROUND OF THE INVENTION

Field of the Invention

The present invention relates to a laminated polyester film for a magnetic recording medium. More particularly, the present invention relates to a laminated polyester film for a magnetic recording medium which achieves cost reduction, has improved slitting properties and generates no or few flaws or abraded powder during traveling when it is used as a base film of a magnetic tape.

Description of the Related Art

A polyester film has excellent mechanical and chemical properties and is widely used in various industrial fields. In particular, a biaxially stretched polyethylene terephthalate film is indispensable as a base film of a magnetic recording medium, since it has better flatness, mechanical strength and dimensional stability than other films.

Recently, properties of the magnetic recording medium has been very quickly improved. With the improvement of the magnetic recording medium, the base film for the magnetic recording medium is increasingly required to have better properties. For example, in the case of a high density recording medium such as a video tape, a surface of the base film should be extremely smooth.

However, as the smoothness of the base film surface is increased, some troubles arise. For instance, when a tape and a metal pin contact each other at a high relative speed as in the case of a magnetic tape, friction and abrasion between them increase so that scratches are formed on the film, or the film is abraded to generate powder.

To solve the above problems, it is proposed to compound particles having a large Moh's hardness such as aluminum oxide particles in the base film (see Japanese Patent Kokai Publication No. 306220/1989).

But, in the above technique, a large amount of the aluminum oxide particles should be compounded to prevent the scratches or the generation of powder sufficiently. As the result, the following new problems arise:

(1) Since the aluminum oxide particles are comparatively expensive, it increases the production cost of the magnetic recording medium disadvantageously.

(2) In the slitting step in the production of the film or the magnetic recording medium, a cutting blade is damaged rather quickly so that the cutting blade should be changed frequently. This leads to the increase of the production cost of the magnetic recording medium or the decrease of productivity.

In the slitting step in the production of the magnetic tapes, when the cutting blades are not changed at suitable intervals, a cutting property of the magnetic tape is deteriorated. The deterioration of the cutting property results in peeling-off of a cut area in a line form and, in some cases, drop-off as cuttings. When such phenomenon is worsened, powder drops off from a magnetic layer of the magnetic recording medium. The dropped powder will cause drop-out.

To improve the cutting property, it is known to increase a crystallinity of the film. Since increase of the crystallinity deteriorates wear resistance of the film, it is unpractical to increase the crystallinity to a sufficient level for the increase of the cutting property.

To solve the above described problems, it may be possible to laminate films and add particles having a large Moh's hardness only to the outermost layer so as to decrease a total amount of the particles in the laminate film. However, in the magnetic recording film, it is desired for the base film to have substantially the same physical properties on both surfaces like a monolayer film. If the above method is simply applied to the base film of the magnetic recording medium, the both surfaces of the film tend to have different surface roughness or different slip properties.

SUMMARY OF THE INVENTION

An object of the present invention is to provide a base film of a magnetic recording medium, which film can solve the above problems associated with the prior art films.

According to the present invention, there is provided a laminated polyester film for a magnetic recording medium, which comprises a first polyester layer (A) containing inorganic particles (a) having a Moh's hardness of at least 8 and an average particle size of 0.005 to 0.5 μm and inactive particles (b) having a Moh's hardness of less than 8 and an average particle size of 0.1 to 3.0 μm and larger than that of the particle (a) and a second polyester layer (B) containing inactive particles (c) having a Moh's hardness of less than 8 and an average particle size of 0.1 to 3.0 μm, wherein a content of the particles (a) is from 0.25 to 5% by weight based on the weight of the polyester in the layer (A) and less than 0.15% by weight of the whole weight of the polyester in the layers (A) and (B), the contents of the particles (b) and (c) are each 0.05 to 2.0% by weight of the polyester in the layers (A) and (B), respectively, and exposed surfaces of the layers (A) and (B) have coefficients of friction ($\mu d$) and surface roughness (Ra) which satisfy the following equations (1) to (3):

$$|\mu d^A - \mu d^B| \leq 0.05 \quad (1)$$

$$Ra^B \leq 0.030 \quad (2)$$

$$|Ra^A - Ra^B| \leq 0.005 \quad (3)$$

wherein $\mu d^A$ and $\mu d^B$ are coefficients of friction of the exposed surfaces of the layers (A) and (B), respectively, and $Ra^A$ and $Ra^B$ are surface roughness (μm) of the layers (A) and (B), respectively.

DETAILED DESCRIPTION OF THE INVENTION

Figure 1:
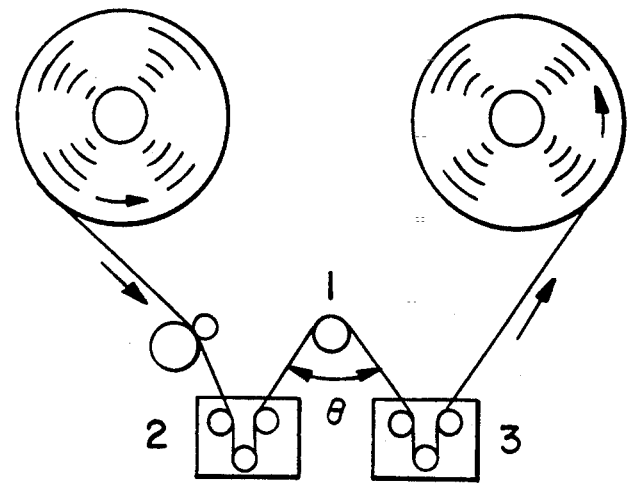
FIG. 1 schematically shows an apparatus used for measuring the slipping property in Examples, and FIG. 2 schematically shows an apparatus used for measuring the abrasion resistance in Examples.

The polyester herein used is a polyester prepared from an aromatic dicarboxylic acid or its ester and glycol at least 80% of repeating units of which are ethylene terephthalate units or ethylene-2,6-naphthalate units.

Insofar as the above requirement is met, the polyester may contain a third component.

Examples of the aromatic dicarboxylic acid are terephthalic acid, 2,6-naphthalene dicarboxylic acid, isophthalic acid, phthalic acid, adipic acid, sebacic acid, oxycarboxylic acids (e.g. p-oxyethoxybenzoic acid) and the like. They may be used independently or as a mixture.

Examples of glycol are ethylene glycol, diethylene glycol, propylene glycol, butanediol, 1,4-cyclohexanedimethanol, neopentyl glycol, and the like. They may be used independently or as a mixture.

The laminated polyester film of the present invention comprises the polyester layer (A) and the polyester layer (B) each of which is stretched at least uniaxially. In the magnetic recording medium, a magnetic layer is formed on the polyester layer (B) of the laminated film.

One of the important objects of the present invention is to decrease the content of the inorganic particles having the Moh's hardness of at least 8 in the entire laminated film without greatly differentiating the physical properties of the both surfaces of the laminate film. Therefore, the exposed surfaces of the layers (A) and (B) of the laminated film of the present invention should have substantially the same physical properties.

First, the coefficients of friction of the exposed surfaces of the layers (A) and (B) of the laminated polyester film of the present invention should satisfy the following equation (1):

$$|\mu d^A - \mu d^B| \leq 0.05 \tag{1}$$

The difference between the coefficients of friction is preferably 0.04 or less, more preferably 0.03 or less.

The surface roughness $Ra^A$ and $Ra^B$ (μm) of the exposed surfaces of the layers (A) and (B) should satisfy the following equations (2) and (3):

$$Ra^B \geq 0.030 \tag{2}$$

$$|Ra^A - Ra^B| \leq 0.005 \tag{3}$$

When the surface roughness of the layer (B) ($Ra^B$) is larger than 0.030 μm, the magnetic recording medium comprising such laminated film has no good electromagnetic conversion property.

$Ra^B$ is preferably 0.027 μm or less, more preferably 0.025 μm or less.

The above difference of the surface roughness between the layers (A) and (B) is preferably 0.003 μm or less, more preferably 0.002 μm or less.

The laminated polyester film of the present invention can be obtained by compounding the specific particles in the layers (A) and (B).

That is, in the polyester layer (A), the particles (a) and (b) are compounded, and in the polyester layer (B), the particles (c) are compounded. Further, the contents of these particles should be within certain ranges as explained The particles (a) to be used in the present invention are inorganic particles having the Moh's hardness of at least 8 and an average particle size of 0.005 to 0.5 μm. Since the layer (A) contains the particles having the Moh's hardness of ar least 8, the scuff resistance and abrasion resistance of the film are greatly improved.

The particles (a) should have an average particle size of 0.005 to 0.5 μm. When the average particle size is larger than 0.5 μm, coarse protuberances due to agglomeration of the particles are formed and will cause the decrease of the electromagnetic conversion property and the increase of drop-out of the magnetic recording medium. When the average particle size is smaller than 0.005 μm, scuff resistance is not satisfactorily improved.

The average particle size of the particle (a) is preferably from 0.005 to 0.3 μm, more preferably from 0.005 to 0.1 μm.

Examples of the inorganic particles having the Moh's hardness of at least 8 are aluminum oxide, silicon carbide, vanadium carbide, titanium carbide, boron carbide, tungusten boride, boron nitride, and the like. Among them, aluminum oxide and silicon carbide are preferred since they are easily available in an industrial scale. In particular, aluminum oxide is preferred. These inorganic particles may be used as a mixture of two or more kinds of the particles.

As aluminum oxide, aluminum oxide prepared by pyrolysis is exemplified. Pyrolysis aluminum oxide may be prepared by flame hydrolysis of anhydrous aluminum chloride and has an average particle size of 0.01 to 0.1 μm.

In the present invention, aluminum oxide prepared by hydrolysis cf an aluminum alkoxide can be preferably used. Such aluminum oxide may be prepared from Al(OC$_2$H$_7$) or Al(OC$_4$H$_9$)$_2$. When conditions of hydrolysis are suitably adjusted, produced aluminum oxide has an average particle size of 0.5 μm or less. In this production method, a clear sol may be obtained by the addition of an acid to a slurry of aluminum oxide and gelled, and then the gel may be heated at a temperature of 500° C. or higher to obtain a sintered mass of aluminum oxide.

Alternatively, to a solution of sodium aluminate, methyl acetate or ethyl acetate is added to obtain AlOOH and then AlOOH is heated to obtain fine powdery aluminum oxide.

In any case, aluminum oxide having an average particle size of 0.1 μm or less is preferably used.

According to the present invention, the aluminum oxide particles are preferably dispersed to primary particles, while it may be used in the form of a secondary particle insofar as the surface conditions of the film are not adversely affected. In the latter case, the secondary particles have an apparent average particle size of 0.5 μm or less, preferably 0.1 μm or less.

When the aluminum oxide particles form agglomerates, a part of aluminum oxide, for example, 30% by weight or less of aluminum oxide may be replaced with at least one metal oxide, for example, oxides of Si, Ti, Fe, Na and K.

The particles (b) and (c) to be used according to the present invention are inactive particles having a Moh's hardness less than 8 and an average particle size larger than that of the particle (a) and from 0.1 to 3.0 μm. When the average particle size of the particles (b) or (c) is smaller than that of the particles (a), it is impossible to lower the content of the particles having the Moh's hardness of at least 8 in the layer (B) without making the difference of the surface properties between the layers (A) and (B) large. When the average particle size of the particles (b) is smaller than 0.1 μm, the film has poor handleability, abrasion resistance, or provides a magnetic recording medium having bad running properties and abrasion resistance. When the average particle size of the particles (c) is smaller than 0.1 μm, the film has poor handleability. When the average particle size of the particles (b) and (c) is larger than 3 μm, the surface roughness of the film is excessively large, so that the electromagnetic conversion properties are deteriorated undesirably.

An example of the inactive particle having the Moh's harness of less than 8 is so-called precipitated particles. The precipitated particles mean fine particles of a metal compound which are precipitated during the production of a polyester. For example, when a transesterification is carried out with the addition of an alkali metal compound or an alkaline earth metal compound before, during or after a transesterification in the presence or absence of a phosphorus compound, inactive particles having an average particle size of 0.1 to 3 μm are precipitated.

Another example of the inactive particles having the Moh's hardness of less than 8 is so-called addition particles which are added during the production of a polyester. Examples of such particles are particles of kaolin, talc, carbon, molybdenum sulfide, gypsum, rock salt, calcium carbonate, silicon oxide, barium sulfide, lithium fluoride, calcium fluoride, zeolite, calcium phosphate, and the like. Among them, calcium carbonate, silicon oxide, barium sulfate, zeolite and calcium phosphate are preferred in view of their dispersibility in the polyester.

Further, heat resistant polymer particles can be used. A typical example of the heat resistant polymer is a copolymer of a monovinyl aliphatic compound having a single unsaturated bond in a molecule and an aliphatic compound having at least two unsaturated bonds in a molecule as a crosslinking agent (cf. for example, Japanese Patent Publication No. 5216/1984). In addition to the above heat resistant polymer particles, particles of thermosetting phenol resins, thermosetting epoxy resins, thermosetting urea resins, benzoguanamine resins, polytetrafluoroethylene, and the like can be used.

A mixture of two or more kinds of inactive particles having the Moh's hardness of less than 8 may be used.

According to the present invention, an amount of the particles (a) in the layer (A) should be from 0.25 to 5% by weight based on the weight of the polyester in the layer (A). When the amount of the particles (a) is less than 0.25% by weight, the scuff resistance and abrasion resistance of the film are not sufficiently improved. When this amount exceeds 5% by weight, coarse protuberances appear on the film surface. Preferably, the amount of the particles (a) is preferably from 0.30 to 3.0% by weight based on the weight of the polyester in the layer (A).

In addition, an amount of the particles (a) should be less than 0.15% by weight based on the weight of the whole polyester in the layers (A) and (B). When an amount of the particles (a) exceeds 0.15% by weight, a cutting blade is heavily damaged in the slitting step of the film, so that the cutting blade should be frequently changed and the productivity is deteriorated.

For example, if the particles (a) are contained in the layer (B) because of recycle use of the film, their amount should be suppressed as much as possible. Then, the amount of the particles (a) is 0.10% by weight, preferably 0.07% by weight, more preferably 0.05% by weight or less, based on the weight of the polyester in the layer (B).

Each of an amount of the particles (b) in the layer (A) and an amount of the particles (c) in the layer (B) is from 0.05 to 2.0% by weight based on the weight of the polyester in the respective layer. When the amount of the particles (b) or (c) exceeds 2.0% by weight, the surface roughness of the film is too large, or the coarse protuberances due to agglomeration of the particles are formed and cause the decrease of the electromagnetic conversion property and the increase of drop-out of the magnetic recording medium. When the amount of the particles (b) is less than 0.05% by weight, the film has poor handleability or abrasion resistance, or provides a magnetic recording medium having bad running properties and abrasion resistance. When the amount of the particles (c) is smaller than 0.05% by weight, the film has poor handleability.

In view of the achievement of substantially the same physical properties on the both surfaces and easy recycling of the laminated polyester film of the present invention, it is preferred that the particles (b) and (c) have the same average particle size and are of the same material, and the contents of the particles (b) and (c) in the layers (A) and (B) are the same.

In the present invention, a ratio of a thickness of the polyester layer (A) to the whole thickness of the laminated film is usually from 5 to 30%, preferably from 7 to 25%, more preferably from 10 to 25%.

When this thickness ratio exceeds 30%, the content of the inorganic particles having the Moh's hardness of at least 8 in the whole film increases so that the cost of the raw materials is not sufficiently decreased. In addition, the slitting property in the production of the film is unsatisfactory. When this ratio is smaller than 5%, the surface properties of the layer (A) will be different from those of a single layer film of the material which constitutes the layer (A).

The laminated film for the magnetic recording medium according to the present invention is particularly suitable as a base film of a magnetic tape in view of a good cutting property, when a difference ($\Delta n$) between a refractive index in a width direction ($n_{TD}$) and that in a longitudinal direction ($n_{MD}$) of the film is at least 0.010.

The cutting property is a property when the magnetic tape is slit with a shear cutter and the like. When the cutting property is bad, a cut area is peeled off in a line form and, in some cases, whiskers or powders are generated from the cut area. When such phenomena appear, white powder deposits on the magnetic tape so that the electromagnetic conversion is deteriorated or the drop-out occurs.

The refractive index different $\Delta n$ is preferably at least 0.020, more preferably at least 0.025. When $\Delta n$ is too large, the magnetic tape tends to thermally shrink. An upper limit of $\Delta n$ is preferably 0.060.

The intrinsic viscosity of the polyester used as a raw material of the laminated film is preferably from 0.52 to 0.60. As the intrinsic viscosity of the polyester is smaller, the film has a better shredding property. However, when the intrinsic viscosity is smaller than 0.52, the film is often broken during the film production so that the productivity is deteriorated. When the intrinsic viscosity is larger than 0.60, the cutting property of the film is not sufficiently improved. A preferred range of the intrinsic viscosity is between 0.54 and 0.60.

A refractive index ($n_\alpha$) in the film thickness direction is from 1.492 to 1.510. When $n_\alpha$ is smaller than 1.492, the sliding property, abrasion resistance and scuff resistance are insufficiently improved. When $n_\alpha$ is larger than 1.510, the abrasion resistance and the resistance to scuffing are insufficient. A preferred range of $n_\alpha$ is between 1.494 and 1.505.

An average refractive index n of the laminated film of the present invention is preferably from 1.598 to 1.604.

When the average refractive index n is smaller than 1.598, a crystallinity of the film is too low, so that a dimensional stability of the film is deteriorated and a skew property is worsened. When the average refractive index is larger than 1.604, the film surface becomes fragile so that the abrasion resistance is deteriorated and the white powder is generated considerably. A preferred range of the average refractive index n is between 1.600 and 1.603.

Now, a production method of the laminated film of the present invention will be explained.

The laminated film of the present invention can be produced by any of conventional methods such as co-extrusion, extrusion-lamination and dry lamination. In view of the productivity of the film and stability of film quality, the co-extrusion is preferably employed. Then, the co-extrusion will be explained as a typical production method of the film of the present invention.

A raw material of the polyester layer (A) containing the particles defined by the present invention and a raw material of the polyester layer (B) containing the particles defined by the present invention are separately prepared and dried with a conventional drier or a vacuum drier separately. Then, they are separately extruded at a temperature of 200° to 320° C. by the co-extrusion method to obtain a laminated film having the layer (A) as a surface layer on at least one surface of the laminated film and cooled and solidified on a casting drum, whereby an amorphous sheet comprising at least two layers is produced. In this production step, a static electricity application method is preferably used since the amorphous sheet having a uniform thickness is obtained.

Then, the amorphous sheet is biaxially stretched and heat set. Stretching conditions are not limited insofar as the stretched film satisfies the film properties defined by the present invention. For example, the amorphous sheet is stretched at a temperature of 90° to 130° C. at a draw ratio of at least 2.5 times in a longitudinal direction and then at a draw ratio of at least 3.2 times in a width direction, followed by heat setting at a temperature of 130° to 250° C. If necessary, the surfaces may be treated in a conventional manner.

After biaxial stretching and heat setting, both edges of the film are slit with cutting blades. The cutting blade is preferably shifted by a distance of several mm to several ten mm to prevent a local damage of the blade.

PREFERRED EMBODIMENTS OF THE INVENTION

The present invention will be illustrated by the following Examples, which do not limit the scope of the present invention. In Examples, "parts" are by weight.

Herein, the properties are measured as follows: (1) Average particle size

Particle sizes are measured by a microscope and a particle size corresponding to a volume percentage of 50% in terms of equivalent ball diameters is regarded as an average particle size.

(2) Intrinsic viscosity

One gram of a polymer is dissolved in 100 ml of a mixed solvent of phenol and tetrachloroethane (a volume ratio of 50:50) and a viscosity of a solution is measured at 30° C.

(3) Refractive index in a film thickness direction ($n_\alpha$)

Using an Abbe refractometer (manufactured by Atago Optical Co., Ltd.), a refractive index is measured with the sodium D line in the film thickness direction at 23° C.

(4) Average refractive index (n)

Using the Abbe refractometer, a maximum refractive index in a plane of the film ($n_\gamma$), a refractive index in a direction perpendicular to the direction of the maximum refractive index ($n_\beta$) and a refractive index in the film thickness direction ($n_\alpha$) are measured with the sodium D line at 23° C., and an average refractive index is calculated according to the following equation:

$$\bar{n} = (n_\alpha + n_\beta + n_\gamma)/3$$

(5) Slitting property in the film production

In the film production step, edges of the biaxially stretched film and the heat set film are slit with stainless steel cutting blades. Then, the blades are replaced with new ones and 30,000 m of each film is slit. Thereafter, a degree of damage of the blades is observed with naked eyes and ranked according to the following criteria:

A: No or little flaws are found on the blades and no change of the blades is necessary.

C: Many clear flaws are found on the blades and change of the blades is necessary.

B: An intermediate state between A and C.

(6) Surface roughness (Ra)

Using a surface roughness tester (SE-3F manufactured by Kosaka Kenkyusho, Ltd.), the center line average roughness is measured according to JIS B-0601-1976, with necessary modifications. The measuring conditions are the use of a contact needle having having a tip radius of 2 μm, 30 mg of probe contact pressure, 0.08 mm of cutoff, and 2.5 mm of a measuring length.

The measurement is performed at 10 points on the film and the measured values were averaged.

(7) Slipping property

An apparatus of FIG. 1 is used.

To a fixed metal (SUS-420-J2) roll plated with hard chromium having a diameter of 6 mm, a film is wound at a contact angle of 135° ($\theta$). A weight of 53 g ($T_2$) is loaded at one end of the film and the film is moved at a rate of 1 m/min. Then, a resistance at the other end ($T_1$, g) is measured. A coefficient of friction ($\mu_d$) is calculated according to the following equation:

$$\mu_d = \frac{180}{x\theta} \ln \frac{T_1}{T_2} = 0.424 \ln \frac{T_1}{53}$$

(8) Abrasion resistance

Figure 2:
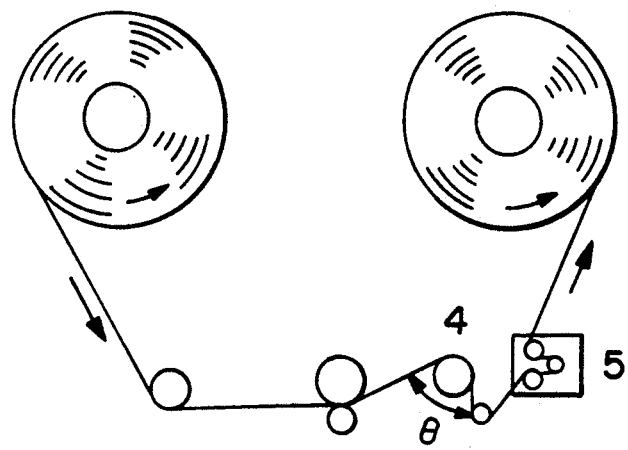

An apparatus of FIG. 2 is used.

A film is run in a length of 200 m and an amount of white powder adhered to a fixed pin is evaluated with naked eyes and ranked according to the following criteria:

A: A very small amount of white powder and good abrasion resistance.

B: A small amount of white powder and practically acceptable.

C: A large amount of white powder and practically unacceptable.

(9) VTR head output

On a NV-3700 video deck (manufactured by Matsushita Electric), a video tape which is produced as follows is run at a normal speed and a VTR head output at a measuring frequency of 4 MHz is measured by a synchroscope. The measured value is expressed as a relative value (dB) to a value of a blank (0 dB).

<Production of a video tape>

Magnetic fine powder (200 parts), a polyurethane resin (30 parts), nitrocellulose (10 parts), a vinyl chloride-vinyl acetate copolymer (10 parts), lecitin (5 parts), cyclohexanone (100 parts), methyl isobutyl ketone (100 parts) and methyl ethyl ketone (300 parts) are mixed and dispersed in a ball mill for 48 hours, followed by the addition of a polyisocyanate compound (5 parts) to obtain a magnetic paint.

The magnetic paint is coated on a polyester film to a dry thickness of 2 μm, magnetically orientated before it is sufficiently dried and then dried.

The coated film is subjected to super calendering and slit at a width of ½ inch to obtain a video tape.

(10) The number of drop-outs

On a NV-3700 video deck (manufactured by Matsushita Electric), the above produced video tape is run at a normal speed to reproduce a video tape which records a signal of 4.4 MHz and the number of drop-outs is counted with a drop-out counter (manufactured by Okura Industries, Ltd.) for about 20 minutes. The result is expressed as the number of drop-outs per one minute.

(11) Scuff resistance

A magnetic tape having a width of ½ inch is passed one time over a metal pin plated with hard chrome having a diameter of 6 mm and a surface roughness of 3S under a tension of 50 g at a contact angle of 135° at a running speed of 4 m/sec. On the contacted surface of the magnetic tape, aluminum is vapor deposited and a degree of flaws is evaluated with naked eyes and ranked according to the following five criteria:

Rank 1: Great many flaws.
Rank 2: Many flaws.
Rank 3: The number of flaws is between Ranks 2 and 4.
Rank 4: A few flaws.
Rank 5: No flaws.

Practically, Ranks 3, 4 and 5 are acceptable. (12) Cutting property (I)

A wide film having a coated magnetic layer is cut to a width of ½ inch with new shear cutting blades and a condition of the cut area of the magnetic tape is observed with an electron microscope. The cutting property is ranked according to the following criteria:

A: The cut area is not peeled off in a line form and no cuttings is generated.
C: The cut area is severely peeled off in a line form and many cuttings are generated.
B: A Condition between A and C.

(13) Cutting property (II)

A wide film having a coated magnetic layer is cut to a width of ½ inch with new shear cutting blades. Then, the blades are replaced with new ones and 50,000 m of each film is slit. Then, a condition of the cut area of the magnetic tape is observed with an electron microscope. The cutting property is ranked according to the following criteria:

A: The cut area is not peeled off in a line form and no cuttings is generated.
C: The cut area is severely peeled off in a line form and many cuttings are generated.
B: A condition between A and C.

EXAMPLE 1

Preparation of a Polyester Film

Dimethyl terephthalate (100 parts), ethylene glycol (60 parts) and magnesium acetate tetrahydrate (0.09 part) were charged in a reactor and heated to effect transesterification while evaporating off methanol. In 4 hours from the start of the reaction, the temperature was raised to 230° C. to complete the transesterification substantially.

Then, 0.5% of $\delta$-$Al_2O_3$ particles, which had been pulverized, sieved and filtered and had the Moh's hardness of 8 and an average particle size of 0.02 μm, were added. Then, ethyl acid phosphate (0.04 part) and antimony trioxide (0.04 part) were added, and a polycondensation reaction was carried out for 4 hours to obtain a polyester (1) having the intrinsic viscosity of 0.61.

Separately, in the same manner as in the above but using 1.5% of $CaCO_3$ particles having the Moh's hardness of 3 and an average particle size of 0.7 μm in place of the $\delta$-$Al_2O_3$ particles, a polyester (2) having the intrinsic viscosity of 0.60 was prepared.

Further, in the same manner as in the above but using no particles, a polyester (3) having the intrinsic viscosity of 0.60 was prepared The polyesters (1) and (2) were blended in a weight ratio of 80:20 to prepare a raw material (A1).

The polyesters (1), (2) and (3) were blended in a weight ratio of 4:20:76 to prepared a raw material (B1).

Each of the raw materials (A1) and (B1) was precrystallized and dried at 180° C. Then, each raw material was co-extruded from separate melt extruders and composited with a thickness ratio (A1/B1) of 13/87 to obtain an amorphous sheet having a thickness of 200 μm.

The amorphous film was then stretched at 110° C. at a draw ratio of 3.5 times in a direction of film flow and at 110° C. at a draw ratio of 3.5 times in a direction perpendicular to the direction of film flow and heat treated at 220° C. for 3 seconds, followed by cooling to obtain a biaxially stretched laminated polyester film having a thickness of 15 μm.

Preparation of a Magnetic Tape

A magnetic paint was coated on a surface of the obtain biaxially stretched laminated film and dried to prepared a magnetic tape, and its cutting property and electromagnetic conversion property were measured. The results are shown in the Table.

EXAMPLE 2

The polyesters (2) and (3) were blended in a weight ratio of 20:80 to obtain a raw material (B2).

In the same manner as in Example 1 but using the raw materials (A1) and (B2) and adjusting a thickness ratio of the A1 layer to the B2 layer to 20:80, a polyester film having a thickness of 15 μm was prepared. Then, in the same manner as in Example 1, a magnetic tape was prepared. Its cutting property and electromagnetic conversion property were measured. The results are shown in the Table.

COMPARATIVE EXAMPLE

In the same manner as in Example 1 but using only the raw material (A1), a single layer biaxially stretched polyester film having a thickness of 15 μm was prepared. Since both surfaces of the film had substantially the same physical properties, one of them was designated as a layer (B) and the magnetic paint was coated on this layer (B) to obtain a magnetic tape. Its cutting property and electromagnetic conversion property are shown in the Table.

TABLE

| Example No. | Example 1 | Example 2 | Comparative Example |
|---|---|---|---|
| Added particles (wt. %) | | | |
| <Layer A> | | | |
| Alumina | 0.40 | 0.40 | 0.40 |
| Calcium carbonate | 0.30 | 0.30 | 0.30 |
| <Layer B> | | | |
| Alumina | 0.02 | 0 | 0 |
| Calcium carbonate | 0.30 | 0.30 | 0 |
| Ratio of Layer A thickness | 13% | 20% | 100% |
| Slitting property | A | A | C |
| Film characteristics | | | |
| [Layer A side] | | | |
| $n_\alpha$ | 1.496 | 1.496 | 1.496 |
| $\Delta n$ | 0.030 | 0.030 | 0.030 |
| n | 1.602 | 1.602 | 1.602 |
| [η] | 0.57 | 0.57 | 0.58 |
| film properties | | | |
| $\mu_d{}^A/\mu_d{}^B$ | 0.23/0.24 | 0.23/0.24 | 0.23/0.23 |
| $Ra^A/Ra^B$ | 0.020/0.019 | 0.020/0.019 | 0.020/0.020 |
| Abrasion resistance of Layer A | A | A | A |
| Magnetic tape properties | | | |
| Resistance to scuffing of Layer A | 5 | 5 | 5 |
| S/N ratio (dB) | +1.0 | +1.1 | +1.0 |
| Dropouts (/min.) | 2.2 | 2.3 | 1.9 |
| Cutting property (I) | A | A | A |
| Cutting property (II) | A | A | C |
| Integrated evaluation | 0 | 0 | X |

The film of Comparative Example was a single layer film. While its film characteristics and film properties were good, it required a large amount of aluminum oxide particles, so that its production cost would be high and the slitting property was worsened and the productivity was low.

In the films of Examples 1 and 2, the contents of the aluminum oxide particles were 0.17 times and 0.20 times of that in Comparative Example, respectively. Therefore, these films are superior in the production cost and the productivity to the film of Comparative Example. In addition, their film characteristics and magnetic tape properties were substantially the same as those in Comparative Example.

What is claimed is:

1. A laminated polyester film for a magnetic recording medium, which comprises
   a first polyester layer (A) containing inorganic particles (a) having a Moh's hardness of at least 8 and an average particle size of 0.005 to 0.5 μm and inactive particles (b) having a Moh's hardness of less than 8 and an average particle size of 0.1 to 3.0 μm and larger than that of the particle (a) and
   a second polyester layer (B) containing inactive particles (c) having a Moh's hardness of less than 8 and an average particle size of 0.1 to 3.0 μm,
   wherein a content of the particles (a) is from 0.25 to 5% by weight based on the weight of the polyester in the layer (A) and less than 0.15% by weight of the whole weight of the polyester in the layers (A) and (B), the contents of the particles (b) and (c) are each 0.05 to 2.0% by weight of the polyester in the layers (A) and (B), respectively, and exposed surfaces of the layers (A) and (B) have coefficients of friction (μd) and surface roughness (Ra) which satisfy the following equations (1) to (3):

$$|\mu_d{}^A - \mu_d{}^B| \leq 0.05 \quad (1)$$

$$Ra^B \leq 0.030 \quad (2)$$

$$i \; |Ra^A - Ra^B| \leq 0.005 \quad (3)$$

wherein $\mu_d{}^A$ and $\mu_d{}^B$ are coefficients of friction of the exposed surfaces of the layers (A) and (B), respectively, and $Ra^A$ and $Ra^B$ are surface roughness (μm) of the layers (A) and (B), respectively.

2. The laminated polyester film according to claim 1, wherein the particles (b) and (c) have the same average particle size and are of the same material, and the contents of the particles (b) and (c) in the layers (A) and (B) are the same.

3. The laminated polyester film according to claim 1, wherein the difference between the coefficients of friction defined by the equation (1) is 0.04 or less.

4. The laminated polyester film according to claim 1, wherein the surface roughness of the layer (B) is 0.027 μm or less.

5. The laminated polyester film according to claim 1, wherein the difference of the surface roughness defined by the equation (3) is 0.003 μm.

6. The laminated polyester film according to claim 1, wherein the average particle size of the particles (a) is from 0.005 to 0.3 μm.

7. A laminated polyester film according to claim 1, wherein the inorganic particles (a) have an average particle size from about 0.005 to 0.1 microns.

8. A laminated polyester film according to claim 1, wherein the content of the inorganic particles (a) in the first polyester layer (A) is from about 0.3 to 3.0% by weight of the first polyester layer (A).

9. A laminated polyester film according to claim 1, wherein the inorganic particles (a) in the first polyester layer (A) are aluminum oxide particles.

10. A laminated polyester film according to claim 1, wherein the content of the inorganic particles (c) in the second polyester layer (B) is about 0.07% or less by weight of the second polyester layer (B).

11. A laminated polyester film according to claim 1, wherein a thickness of the first polyester layer (A) is about 5 to 30% of a thickness of the laminated polyester film.

12. A laminated polyester film according to claim 1, wherein the average refractive index (n) of the laminated polyester film is from about 1.598 to 1.604.

13. A laminated polyester film according to claim 1, wherein the refractive index different (Δn) of the laminated polyester film is from about 0.025 to 0.060.

14. A laminated polyester film according to claim 1, wherein the refractive index ($n_\alpha$) in the film thickness direction of the laminated polyester film is from about 1.492 to 1.510.

* * * * *